(12) United States Patent
Pöschmann et al.

(10) Patent No.: US 11,188,051 B2
(45) Date of Patent: Nov. 30, 2021

(54) METHOD AND CLOUD GATEWAY FOR MONITORING AN AUTOMATED FACILITY

(71) Applicant: Endress+Hauser Process Solutions AG, Reinach (CH)

(72) Inventors: Axel Pöschmann, Basel (CH); Michael Mayer, Oberwil (CH); Michael Maneval, Schopfheim (DE)

(73) Assignee: Endress+Hauser Process Solutions AG, Reinach (CH)

( * ) Notice: Subject to any disclaimer, the term of this patent is extended or adjusted under 35 U.S.C. 154(b) by 115 days.

(21) Appl. No.: 16/658,728

(22) PCT Filed: Mar. 12, 2018

(86) PCT No.: PCT/EP2018/056002
§ 371 (c)(1),
(2) Date: Oct. 21, 2019

(87) PCT Pub. No.: WO2018/192712
PCT Pub. Date: Oct. 25, 2018

(65) Prior Publication Data
US 2020/0387136 A1    Dec. 10, 2020

(30) Foreign Application Priority Data

Apr. 21, 2017  (DE) ..................... 10 2017 108 539.4

(51) Int. Cl.
*G05B 19/406* (2006.01)
*H04L 12/66* (2006.01)
(Continued)

(52) U.S. Cl.
CPC ............ *G05B 19/406* (2013.01); *H04L 12/66* (2013.01); *H04L 43/50* (2013.01); *H04L 67/10* (2013.01);
(Continued)

(58) Field of Classification Search
CPC ....... H04L 67/10; H04L 67/12; H04L 67/125; H04L 12/66; H04L 41/0803;
(Continued)

(56) References Cited

U.S. PATENT DOCUMENTS 8,370,917 B1 * 2/2013 Hayes .................... H04L 63/08
726/12
8,856,302 B2 * 10/2014 Karaffa .............. G05B 19/4186
709/223
(Continued)

FOREIGN PATENT DOCUMENTS

DE    102010029952 A1    12/2011
DE    102011079890 A1    1/2013
(Continued)

*Primary Examiner* — Shean Tokuta
(74) *Attorney, Agent, or Firm* — Mark A. Logan; Endress+Hauser (USA) Holding Inc.

(57) ABSTRACT

The present disclosure resides in a method for monitoring an automated facility, wherein a plurality of field devices are integrated in the facility, comprising: connecting a cloud gateway with a first communication network of the facility; ascertaining field devices connected to the first communication network; testing whether device descriptions corresponding to the field devices are present in a server connected with the cloud gateway via a second communication network; downloading from the server device descriptions corresponding to the field devices and installing the device descriptions in the cloud gateway; creating a configuration plan, wherein the configuration plan defines at least one field device to be queried, the type of queried data, and the frequency of the querying; transmitting the configuration plan to the cloud gateway; querying data from the queried field devices according to the configuration plan; transmitting queried data to the server; and collecting and evaluating transmitted data.

9 Claims, 1 Drawing Sheet

(51) Int. Cl.
*H04L 12/26* (2006.01)
*H04L 29/08* (2006.01)

(52) U.S. Cl.
CPC .............. *G05B 2219/25061* (2013.01); *G05B 2219/31368* (2013.01)

(58) Field of Classification Search
CPC ..... H04L 41/0813; H04L 43/04; H04L 43/10; G05B 2219/32144
See application file for complete search history.

(56) References Cited

U.S. PATENT DOCUMENTS

| | | | | |
|---|---|---|---|---|
| 8,885,665 B2* | 11/2014 | Karaffa | .............. | G05B 19/4186 370/466 |
| 2008/0095179 A1* | 4/2008 | Lee | .................. | H04L 12/66 370/401 |
| 2013/0041485 A1* | 2/2013 | Gunzert | ............. | G05B 19/4186 700/79 |
| 2013/0212214 A1* | 8/2013 | Lawson | ................ | H04L 43/045 709/217 |
| 2014/0218209 A1* | 8/2014 | Koch | ..................... | G08C 17/02 340/870.02 |
| 2015/0281356 A1* | 10/2015 | Maturana | .............. | G06F 9/5072 709/217 |
| 2015/0372865 A1* | 12/2015 | Schmirler | ........... | H04L 41/0813 709/221 |
| 2016/0261481 A1* | 9/2016 | Ogata | .................... | H04L 43/10 |
| 2016/0274553 A1* | 9/2016 | Strohmenger | ......... | G05B 17/02 |
| 2017/0109436 A1* | 4/2017 | DelSordo | ............ | H04L 41/0686 |
| 2018/0052451 A1* | 2/2018 | Billi-Duran | ...... | G05B 19/41855 |
| 2018/0131574 A1* | 5/2018 | Jacobs | .................... | G06F 8/65 |
| 2018/0300437 A1* | 10/2018 | Thomsen | .......... | G06F 16/24573 |
| 2019/0163173 A1* | 5/2019 | Goldschmidt | ..... | G05B 23/0267 |
| 2019/0204390 A1* | 7/2019 | Krishnamoorthi | ... | G01R 31/343 |

FOREIGN PATENT DOCUMENTS

| | | |
|---|---|---|
| DE | 102011080569 A1 | 2/2013 |
| WO | 2004013712 A1 | 2/2004 |

* cited by examiner

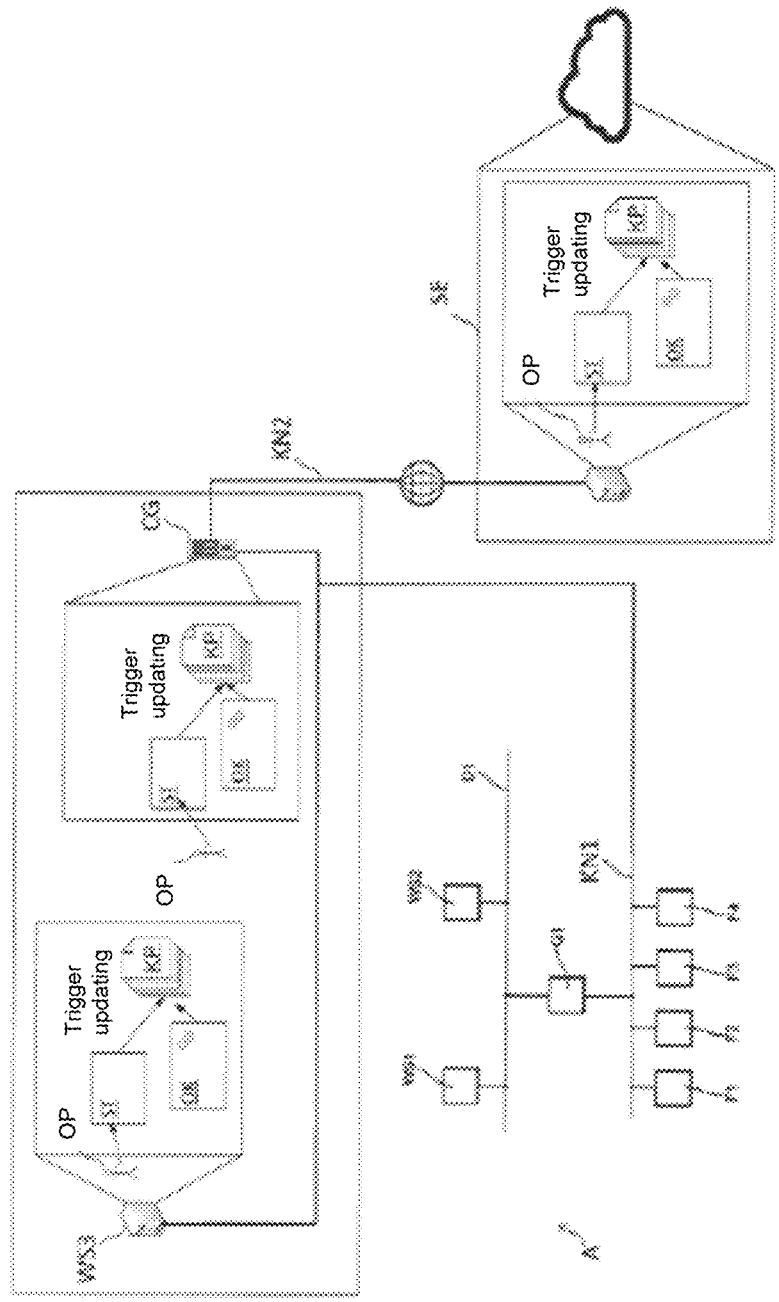

METHOD AND CLOUD GATEWAY FOR MONITORING AN AUTOMATED FACILITY

CROSS-REFERENCE TO RELATED APPLICATIONS

The present application is related to and claims the priority benefit of German Patent Application No. 10 2017 108 539.4, filed on Apr. 21, 2017 and International Patent Application No. PCT/EP2018/056002 filed on Mar. 12, 2018, the entire contents of which are incorporated herein by reference.

TECHNICAL FIELD

The invention relates to a method for monitoring an automated facility, wherein a plurality of field devices are integrated in the facility, wherein the field devices generate data, especially measurement data, control data, calibration/parametering data, diagnosis-, history- and/or status data, and wherein the field devices can communicate with one another and with at least one superordinated unit by means of a first communication network. Furthermore, the invention relates to a cloud gateway, which is embodied for executing the method of the invention.

BACKGROUND

Known from the state of the art are field devices, which are used in industrial facilities. Field devices are often applied in automation technology, as well as in manufacturing automation. Referred to as field devices are, in principle, all devices, which are applied near to a process and which deliver, or process, process relevant information. Thus, field devices are used for registering and/or influencing process variables. Serving for registering process variables are measuring devices, or sensors. These are used, for example, for pressure- and temperature measurement, conductivity measurement, flow measurement, pH measurement, fill level measurement, etc. and register the corresponding process variables, pressure, temperature, conductivity, pH value, fill level, flow, etc. Used for influencing process variables are actuators. These are, for example, pumps or valves, which can influence the flow of a liquid in a tube or the fill level in a container. Besides the above mentioned measurement devices and actuators, referred to as field devices are also remote I/Os, radio adapters, and, in general, devices, which are arranged at the field level.

A large number of such field devices are produced and sold by the Endress+Hauser group of companies.

In modern industrial facilities, field devices are, as a rule, connected via communication networks, such as, for example, fieldbusses (Profibus®, Foundation® Fieldbus, HART®, etc.), with superordinated units. The superordinated units involve control units, such as, for example, a PLC (programmable logic controller). The superordinated units serve, among other things, for process control, as well as for start-up of field devices. The measured values registered by the field devices, especially by their sensors, are transmitted via the particular bus system to a (or, in given cases, a number of) superordinated unit(s), which, in given cases, further process the measured values and forward them to a control station of the facility. The control station serves for process visualizing, process monitoring and process control via the superordinated units. In addition, also required is a data transmission from the superordinated unit via the bus system to the field devices, especially for configuration and parametering of field devices as well as for operating actuators.

Today's available systems for monitoring plant components (so-called "asset health" systems) cyclically query data from field devices (for example, information concerning device health). The information concerning which data should be downloaded is, however, stored locally in the monitoring system. Disadvantageous in such solution is that the monitoring system travels locally and the information concerning data to be queried is only locally available. An automatic updating or a remote configuration of the monitoring system is, thus, not provided. By way of example, upon the installation of a new field device type, the locally stored information must be updated—otherwise, the field device is not known to the monitoring system or only standardized field device data can be retrieved. Manufacturer-specific, diagnostic data, such as, for example, "heartbeat" diagnostic data available in the case of field devices of the applicant, are not queryable in this way.

SUMMARY

Based on the above, an object of the invention is to provide a method and a cloud gateway, which enable a user friendly and especially flexible monitoring of components of an automated facility.

The object is achieved by a method for monitoring an automated facility, wherein a plurality of field devices are integrated in the facility, wherein the field devices generate data, especially data in the form of measurement data, control data, calibration/parametering data, diagnosis-, history- and/or status data, and wherein the field devices can communicate with one another and with at least one superordinated unit by means of a first communication network, comprising:
- connecting a cloud gateway, especially a router or a switch, with the first communication network of the facility;
- ascertaining by means of the cloud gateway the field devices connected to the first communication network;
- testing whether for at least a part of the ascertained field devices device descriptions corresponding to the ascertained field devices are present in a server connected with the cloud gateway via a second communication network;
- downloading from the server via the second communication network device descriptions corresponding to the ascertained field devices and installing the device descriptions in the cloud gateway;
- creating at least one configuration plan by means of the server, wherein the configuration plan defines at least one field device to be queried, the type of queried data of the field devices and the frequency of the querying, or one or more points in time for the querying, of the data for each one of the field devices to be queried;
- transmitting the configuration plan to the cloud gateway;
- querying data from queried the field devices by means of the cloud gateway according to the configuration plan located in the cloud gateway;
- transmitting queried data to the server by the cloud gateway; and
- collecting and evaluating transmitted data in the server.

A great advantage of the method of the invention is that, in simple manner, a monitoring of field devices of automation technology in a facility can be established. The cloud gateway has a virtually "Plug and Play" functionality, in that it automatically detects all field devices connected to it and downloads their corresponding device descriptions from the server. In such case, only device descriptions for field devices actually present are downloaded. In the ideal case, an operator needs only to connect the cloud gateway to one or more fieldbusses and input the parameters for communication with the server via the second communication network. These parameters are, for example, access data for the server.

The cloud gateway is embodied in such a manner that it can be connected with a plurality of different communication networks, which differ both as regards hardware (OSI Layer 1, for example, as regards plug type, transmitted electrical power, etc.), however, also as regards the utilized protocols. The first communication network can, in such case, be embodied both wired as well as also wirelessly. Supported, for example, are fieldbusses of automation technology, such as, for example, HART, Profibus, Foundation Fieldbus, however, also IT communication networks, such as Ethernet, by way of example. The cloud gateway enables the simultaneous connection of a plurality of first communication networks, which may differ from one another.

The second communication network is especially the Internet, or a communication network, which enables access to the Internet. In the case, in which the second communication network is embodied wirelessly, such as especially GSM, UMTS, LTE, 5G, etc. The server is advantageously reachable by an operator by means of the Internet and enables cloud functionalities.

The creation of the configuration plan is either performed automatically by the server, or with the help of the operator. In the latter case, the operator connects with the server, for example, by means of a PC, and creates the configuration plan, for example, with the help of an input screen.

Examples of field devices for the method of the invention are given above in the introductory part of the description.

An advantageous, further development of the method of the invention provides that an incorporating of a new field device into the facility is automatically detected by the cloud gateway.

In a preferred embodiment of the method of the invention, it is provided that the cloud gateway downloads from the server and installs for the new field device a device description corresponding to the new field device.

Adding a new field device, is, thus, possible without problem, in order to increase the flexibility of the monitoring. The detecting and downloading of the device description happens also here automatically, so that an operator does not have to perform these steps.

Furthermore, it can be provided that the device descriptions for one or more field devices are independently updated, when the field device either receives a new hardware configuration or is newly parametered, or the firmware is updated, or when updated device descriptions become available for one or more field devices, or field device types.

An advantageous, further development of the method of the invention provides that the configuration plan located currently in the cloud gateway is adapted by means of the server, in that the server has a copy of the configuration plan, wherein an operator accesses the server and changes the definitions contained in the copy of the configuration plan. In such case, it can be the server, where the queried data are transmitted, or from which the device descriptions are downloaded. Alternatively, the server is located locally with the operator/customer. It can also be provided that the server, by means of which the operator edits the configuration plan, is embodied as web server of the cloud gateway.

In a preferred embodiment of the method of the invention, it is provided that the adapted copy of the configuration plan is loaded into the cloud gateway, in order to update the configuration plan currently located in the cloud gateway. It can, in such case, be provided that the previously present configuration plan is stored in a history, in order to be able to reuse such, when required.

An especially advantageous, further development of the method of the invention provides that the cloud gateway independently optimizes and updates the configuration plan currently located in the cloud gateway based on historical information. An example of such historical information can be events, which are generated in a case of diagnosis of a field device. It can also be provided that the independent optimizing of the configuration plan by the server is allowed to proceed, when the server has access to the historical information.

In an especially preferred embodiment of the method of the invention, it is provided that the updating of the configuration plan is performed in the ongoing operation of the cloud gateway. The operation of the cloud gateway is thus not interrupted thereby, which enables a flexible and simple adapting.

In an advantageous embodiment of the method of the invention, it is provided that the adapted copy of the configuration plan, or the configuration plan updated by the cloud gateway, is stored in the server and suggested as standard for the product type of the field device and/or for the process location of the field device. A user can, in this way, adopt preconfigured configuration plans suitable for the application.

In an advantageous embodiment of the method of the invention, it is provided that the field device generates a warning report and transmits such to the server, when for at least one of the field devices no appropriate device description is present in the database. The operator is, for example, requested by the warning report to load the missing device descriptions into the server, or given an Internet address, where the missing device descriptions can be obtained.

Furthermore, the object is achieved by a cloud gateway embodied for executing the method of the invention. The cloud gateway is a network device, especially a switch or a router, which establishes a connection of the field devices to the server.

BRIEF DESCRIPTION OF THE DRAWING

The invention will now be explained in greater detail based on the appended drawing, the sole FIGURE of which shows as follows:

FIG. 1 shows an example of an embodiment of the system of the present disclosure.

DETAILED DESCRIPTION

FIG. 1 shows an example of an embodiment of the system of the invention in the context of an automated facility A. Connected to a data bus D1 are a number of work station PCs, WS1, WS2 at the control level of the facility A. These work station PCs serve as superordinated units (control systems, or control units), among other things, for process visualizing, process monitoring and for engineering, such as for servicing and monitoring field devices. The data bus D1 works e.g. according to the Profibus DP standard or the HSE (High Speed Ethernet) standard of Foundation Fieldbus. Via a gateway G1, which is also referred to as a linking device, field controller or even as a segment coupler, the data bus D1 is connected with a fieldbus segment SM1. Fieldbus segment SM1 is composed of a number of field devices F1, F2, F3, F4, which are connected with one another via a first communication network KN1. The field devices F1, F2, F3, F4 can be sensors or actuators.

In the case of the first communication network, is it especially a fieldbus of automation technology, which works corresponding to one of the known e.g. fieldbus standards, Profibus, Foundation Fieldbus or HART.

Examples and functions of such field devices F1, F2, F3, F4 are set forth above in the introductory part of the description.

Connected to the first communication network KN1 is a cloud gateway CG. The cloud gateway CG is especially a router or a switch. The cloud gateway CG is connected via a second communication network KN2 for communication with a cloud capable server SE. The second communication network KN2 is especially the Internet. Besides the first communication network KN1, the cloud gateway CG can be connected to a large number of further, different, communication networks.

Upon first connecting with the first communication network KN1, the cloud gateway CG searches for field devices F1, F2, F3, F4 connected to the first communication network KN1. For this, it observes, for example, the cyclic data traffic between the field devices and the gateway G1 and extracts from such the fieldbus addresses of the field devices F1, F2, F3, F4. Then, the cloud gateway queries by means of acyclic communication other information of the field devices F1, F2, F3, F4, for example, serial number, device type, firmware version, etc. For this, depending on fieldbus, the cloud device is embodied as master.

By means of this additional information, the cloud gateway CG can unequivocally determine the field devices F1, F2, F3, F4 and download from the server SE and install the appropriate device descriptions or drivers. These procedures happen automatically and represent a great convenience for an operator OP. If no fitting device descriptions are present for one or more field devices F1, F2, F3, F4 in the server SE, then the cloud gateway CG generates an alarm message, which is transmitted to the server SE.

If field devices F1, F2, F3, F4 are updated or new field devices are installed, then the cloud gateway CG detects these changes automatically and downloads the appropriate device descriptions for the changed field devices F1, F2, F3, F4.

Located in the cloud gateway CG is at least one configuration plan KP, or flow plan. The configuration plan KP establishes, at which points in time which data should be downloaded from which field devices F1, F2, F3, F4 by means of the cloud gateway. If a plurality of first communication networks are connected to the cloud gateway CG, then each of these first communication networks can have its own configuration plan in the cloud gateway CG.

The creating of such a configuration plan KP can be performed by an operator OP by means of the server SE. For this, the operator OP connects, for example, by means of a PC via the Internet with the server SE and authenticates by establishing authority to use the server. After transpired authentication, the operator OP accesses a software tool ST of the server SE, which displays a list all cloud gateways CG associated with it and the field devices F1, F2, F3, F4 connected therewith. In such case, the operator OP is also shown an alarm message generated upon absence of a fitting device description for a field device F1, F2, F3, F4 of a cloud gateway CG. By means of input screens, the operator OP can then comfortably create configuration plans KP for the different cloud gateways CG. Furthermore, the operator OP is shown the already present configuration plans KP located in the cloud gateway CG and can inspect them, and, when required, update them.

After creating, or updating, a configuration plan KP, such is transmitted into the cloud gateway CG, whereupon such configuration plan KP is installed, or an already present configuration plan KP written over. For this, the operation of the cloud gateway CG is not interrupted, so that an occasionally time-consuming restart of the cloud gateway CG on-site is not necessary. Advantageously, there is provided in the server SE an automatic optimizing component OK, which can independently update a configuration plan KP based on historical information.

Alternatively, the server SE does not contain the software tool ST and/or the automatic optimizing component OK, but, instead, the facility A has a PC WS3 connected with the first communication network KN1 and containing the software tool ST and/or the automatic optimizing component OK.

Alternatively, the cloud gateway CG contains the software tool ST and/or the automatic optimizing component OK. In such case, the operator OP can access these components, for example, via a web server of the cloud gateway CG.

Based on the configuration plan KP, the cloud gateway CG queries the data from the field devices F1, F2, F3, F4 and transmits the queried data by means of the second communication network KN2 to the server SE. There the data are collected and can be inspected by the operator OP and used for additional processing.

The invention claimed is:

1. A method for monitoring an automated facility, wherein a plurality of field devices are integrated in the facility, wherein the field devices generate data, including measurement data, control data, calibration and parametering data, diagnosis data, history data, and status data, and wherein the field devices are configured to communicate with one another and with a superordinate unit using a first communication network, the method comprising:

connecting a cloud gateway with the first communication network of the facility;

ascertaining with the cloud gateway the field devices connected to the first communication network;

testing whether device descriptions corresponding to the ascertained field devices are present in a server connected with the cloud gateway via a second communication network;

downloading from the server via the second communication network device descriptions corresponding to the ascertained field devices and installing the device descriptions in the cloud gateway;

the cloud gateway generating a warning report and transmitting the warning report to the server when for at least one of the field devices no appropriate device description is present on the server;

creating a configuration plan using the server, wherein the configuration plan defines at least one field device to be queried, data to be queried of the at least one field device, a frequency of the querying, and one or more points in time for the querying;

transmitting the configuration plan to the cloud gateway;

querying data from the at least one field device with the cloud gateway according to the configuration plan located in the cloud gateway;

transmitting the queried data to the server by the cloud gateway; and collecting and evaluating transmitted data in the server.

2. The method as claimed in claim 1, wherein an incorporating of a new field device into the facility is automatically detected by the cloud gateway.

3. The method as claimed in claim 2, further comprising:
  downloading from the server a device description corresponding to the new field device and installing the device description in the cloud gateway.

4. The method as claimed in claim 1, wherein the server has a copy of the configuration plan, the method further comprising:
  adapting the configuration plan, via an operator accessing the server and changing the definitions contained in the copy of the configuration plan.

5. The method as claimed in claim 4, further comprising:
  loading the adapted copy of the configuration plan into the cloud gateway to update the configuration plan currently located in the cloud gateway.

6. The method as claimed in claim 1, further comprising:
  the cloud gateway independently optimizing and updating the configuration plan currently located in the cloud gateway based on historical information.

7. The method as claimed in claim 5, wherein the updating of the configuration plan is performed in an ongoing operation of the cloud gateway.

8. The method as claimed in claim 4, wherein the adapted copy of the configuration plan is stored in the server and suggested as standard for the product type of the field device and/or the process location of the field device.

9. A cloud gateway embodied for executing a method for monitoring an automated facility, wherein a plurality of field devices are integrated in the facility, wherein the field devices generate data, including measurement data, control data, calibration and parametering data, diagnosis data, history data, and status data, and wherein the field devices are configured to communicate with one another and with at least one superordinate unit using a first communication network, wherein the method includes:
  ascertaining with the cloud gateway the field devices connected to the first communication network;
  testing whether device descriptions corresponding to the ascertained field devices are present in a server connected with the cloud gateway via a second communication network;
  downloading from the server via the second communication network device descriptions corresponding to the ascertained field devices and installing the device descriptions in the cloud gateway;
  generating a warning report and transmitting the warning report to the server when for at least one of the field devices no appropriate device description is present on the server;
  receiving a configuration plan from the server, wherein the configuration plan defines at least one field device to be queried, data to be queried of the at least one field device, a frequency of the querying, and one or more points in time for the querying;
  querying data from the at least one field device with the cloud gateway according to the configuration plan located in the cloud gateway; and
  transmitting the queried data to the server by the cloud gateway.

\* \* \* \* \*